United States Patent
Chen et al.

(10) Patent No.: US 8,025,001 B2
(45) Date of Patent: Sep. 27, 2011

(54) MITER SAW WITH SUPPORT DEVICES

(75) Inventors: Jung-Huo Chen, Taichung (TW); Ching-Hua Tsai, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 255 days.

(21) Appl. No.: 12/003,810

(22) Filed: Jan. 2, 2008

(65) Prior Publication Data

US 2008/0302224 A1   Dec. 11, 2008

(30) Foreign Application Priority Data

Jan. 9, 2007  (TW) ............................... 96200423 U

(51) Int. Cl.
*B26D 7/01*     (2006.01)
*B27B 5/20*     (2006.01)
(52) U.S. Cl. .......... 83/471.3; 83/483.1; 83/490; 83/581; 144/287; 269/289 R
(58) Field of Classification Search ............... 83/471, 83/471.2, 471.3, 472, 473, 477, 477.1, 468.2, 83/468.3, 468.5, 468.6, 486.1, 490, 581; 144/286.1, 287; 269/289 R, 309, 311
See application file for complete search history.

(56) References Cited

U.S. PATENT DOCUMENTS

| 2,313,617 | A | | 3/1943 | Bray | |
|---|---|---|---|---|---|
| 4,875,399 | A | * | 10/1989 | Scott et al. | 83/468.3 |
| 5,564,323 | A | * | 10/1996 | Sasaki et al. | 83/471.3 |
| 5,644,964 | A | * | 7/1997 | Price | 83/459 |
| 6,073,529 | A | * | 6/2000 | Shibata et al. | 83/468.5 |
| 7,156,008 | B2 | * | 1/2007 | Talesky | 83/468.2 |
| 7,228,775 | B2 | * | 6/2007 | Wang | 83/471.3 |
| 2007/0175305 | A1 | * | 8/2007 | Svetlik et al. | 83/471.3 |

\* cited by examiner

*Primary Examiner* — Clark F. Dexter
(74) *Attorney, Agent, or Firm* — Bacon & Thomas, PLLC

(57) ABSTRACT

A miter saw includes a base, a rotatable table, a saw arm, a driver, a saw blade, and two supporters. The rotatable table is pivotally mounted to the base and is rotatable relative to the base. The rotatable table includes a support surface configured to receive a workpiece thereon. The saw arm is coupled to the rotatable table and is pivotable downwards towards the support surface. The driver is mounted on the saw arm. The saw blade is mounted on the saw arm and is driven by the driver to cut the workpiece. The two supporters are respectively pivotally mounted to the rotatable table and are configured to support the workpiece thereon while in a supporting position, and to be pivoted to an unobtrusive stowed position when not in use.

10 Claims, 4 Drawing Sheets

MITER SAW WITH SUPPORT DEVICES

BACKGROUND

1. Field of the Invention

The present disclosure relates to a miter saw and more particularly, to a miter saw being able to firmly support a broader workpiece.

2. Description of the Related Art

The miter saws adopted to cut wood can be substantially distinguished into sliding miter saws and non-sliding miter saws, wherein sliding miter saws are able to cut workpieces with broader width.

The construction of a conventional sliding miter saw is summarized as follows:

A base 2 is pivotally mounted with a rotatable table 3, upon which is configured to receive a workpiece thereon, an extended arm 4 extends from the rotatable table 3, and a slot 5 extends from the rotatable table 3 to the extended arm 4. The length of the slot 5 corresponds to the sliding distance of a saw blade 6 for sliding forwards backwards and the slot 5 is configured to receive the saw blade 6 therein. A support arm 7 is coupled to the rear end of the rotatable table 3. A sliding arm 8 that is able to slide forwards backwards is coupled to the top end of the support arm 7. The front end of the sliding arm 8 is pivotally coupled with a pivot arm 9. The saw blade 6 is mounted on the pivot arm 9 and is slidable forwards and backwards relative to the rotatable table 3 via the sliding arm 8 and is rotatable upwards and downwards relative to the rotatable table 3 via the pivot arm 9 to perform a cutting operation.

However, when cutting a broader workpiece by the conventional sliding miter saw 1, the width of the workpiece is larger than the width of the rotatable table 3, and the workpiece juts out over the rotatable table 3 and extends over the extended arm 4, thus the sliding miter saw 1 supports the portion of the workpiece extending beyond the rotatable table 3 only by the narrow extended arm 4. During the cutting operation, the extended arm 4 cannot stably support the workpiece such that not only the cutting performance may be affected but may also increase the dangers of possible injury while cutting.

SUMMARY

In view of the foregoing, an exemplary embodiment of the present disclosure aims to provide a miter saw incorporating a device that assists in supporting a broader workpiece in order to increase the convenience and safety in use.

Accordingly, a miter saw comprises a base, a rotatable table, a saw arm, a driver, a saw blade and two supporters. The rotatable table is pivotally mounted to the base and rotatable relative to the base, and includes a workpiece support surface configured to receive a workpiece thereon. The saw arm is coupled to the rotatable table and is pivotable downward towards the workpiece support surface. The driver is installed on the saw arm. The saw blade is mounted on the saw arm and is driven by the driver to cut the workpiece. The two supporters are respectively pivotally mounted to the rotatable table for supporting the workpiece thereon while in a supporting position, and to be pivoted to an unobtrusive stowed position when not in use.

In an exemplary embodiment, the rotatable table includes a main body, and an extended arm extending from the main body. The two supporters are respectively pivotably located at the two opposed outer sides of the extended arm. When using the miter saw in the embodiment to cut a broader workpiece, since the width of the workpiece is larger than the main body, the workpiece juts out over the main body and extends over the extended arm. Thus, a user can rotate the two supporters from the unobtrusive stowed position to an appropriate angle to assist in supporting the portion of the workpiece extending away from the main body, such that the conventional drawback of instability caused by only using the extended arm to support the portion of workpiece jutting out over the rotatable table can be improved. Furthermore, when the workpiece is in no need of auxiliary support, the two supporters can be rotated towards the extended arm to respectively join the sides of the extended arm and to be positioned in an unobtrusive storage status so as to increase safety and reduce the possibility of hindering the cutting operation of regular sized workpieces.

DETAILED DESCRIPTION

Figure 1:
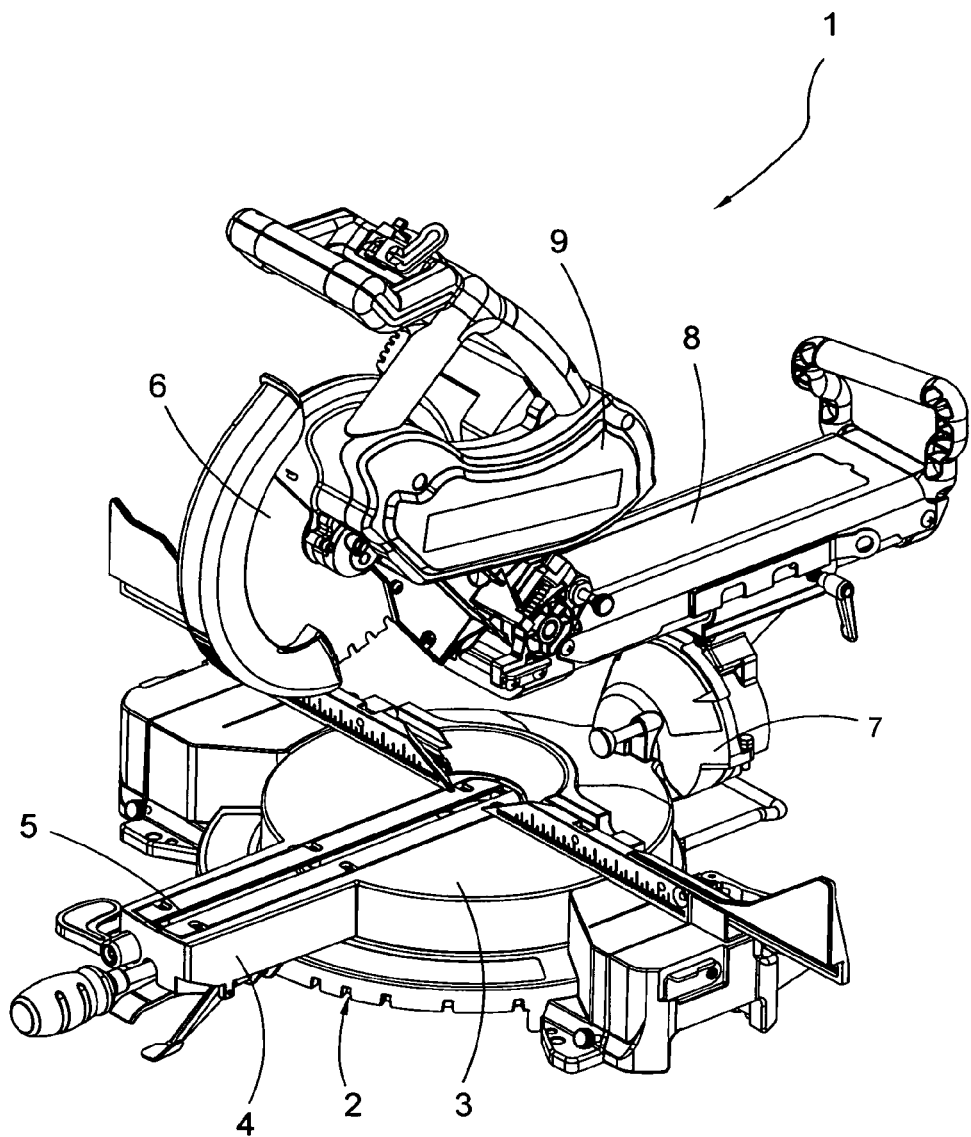
FIG. 1 is a perspective view of a conventional miter saw.
Figure 2:
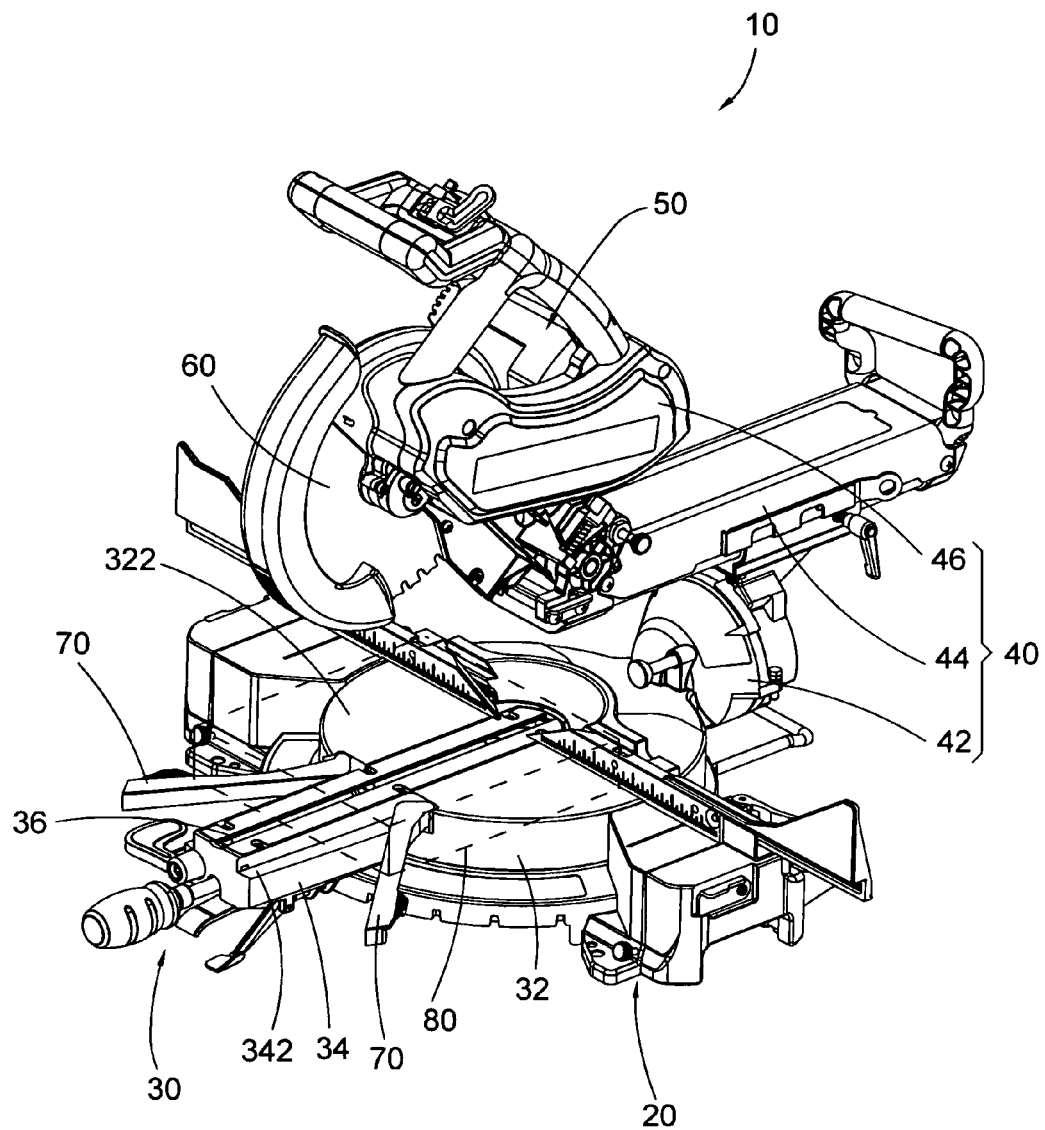
FIG. 2 is a perspective view of a miter saw according to an exemplary embodiment.

Referring to FIG. 2, a miter saw 10 provided by an exemplary embodiment of the present disclosure comprises a base 20, a rotatable table 30, a saw arm 40, a driver 50, a saw blade 60 and two supporters 70.

Figure 3:
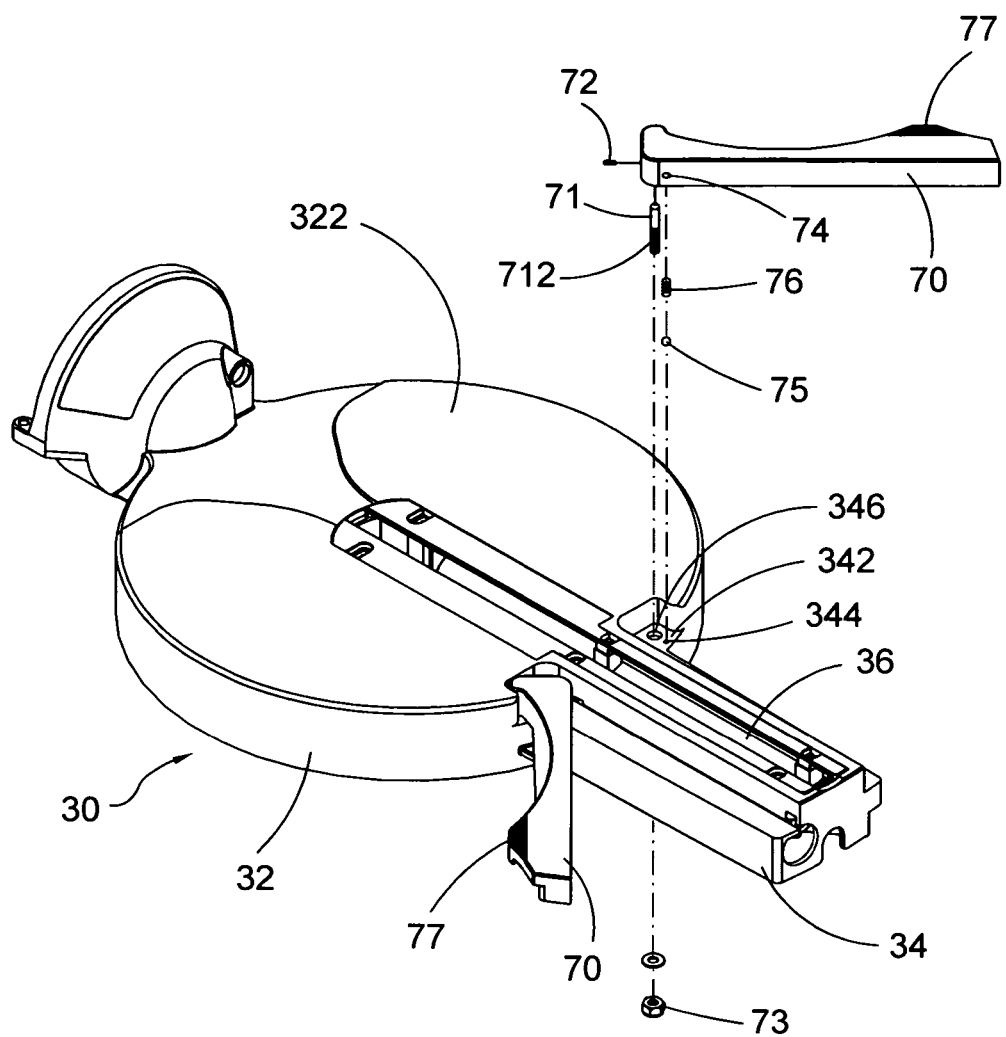
FIG. 3 is an exploded view of a rotatable table and two supporters of the miter saw according to the exemplary embodiment.

Referring to FIGS. 2 and 3, the rotatable table 30 is pivotally mounted to the base 20, and is able to rotate relative to the base 20, and includes a main body 32, an extended arm 34, a slot 36 and two recesses 342. The top surface of the rotatable table forms a workpiece support surface 322 that is configured to receive a workpiece 80 (shown in phantom) thereon. The main body 32 is pivotally mounted on the base 20, and is generally shaped like a circle. The extended arm 34 extends outwards from the main body 32. The slot 36 extends from the main body 32 to the extended arm 34. The two recesses 342 are located upon the main body 32 and are respectively located in and adjacent to the two opposed outer sides of the extended arm 34. The bottom of each of the two recesses 342 is a part of the rotatable table 30, and each of the two recesses 342 includes a set hole 344 and a pivot hole 346. A line formed between the set hole 344 and the pivot hole 346 is parallel to the extending direction of the extended arm 34.

The saw arm 40 includes a support arm 42, a sliding arm 44, and a pivot arm 46. The support arm 42 is pivotally mounted on the rotatable table 30 and is able to be pivoted leftwards and rightwards relative to the rotatable table. The sliding arm 44 is slidably coupled with the support arm 42 and is slidable forwards and backwards relative to the support arm 42. The pivot arm 46 is pivotally coupled with the sliding arm 44 and is able to be rotated downward towards the support surface 322.

The driver 50 is mounted on the pivot arm 46, and includes a motor. The saw blade 60 is mounted on the pivot arm 46 and is able to be driven by the motor to rotate to cut the workpiece 80. When the pivot arm 46 is rotated downward, the saw blade 60 is conducted to move towards the support surface 322, and when the sliding arm 44 is slid forwards and backwards relative to the support arm 7, the saw blade 60 is conducted to slide forwards and backwards relative to the support surface 322. Wherein the sliding distance of the saw blade 60 corresponds to the length of the slot 36.

Referring to FIG. 3, an end portion of each of the two supporters 70 includes a shaft 71 and a setscrew 72. The lower half of the shaft 71 is formed with threads 712 and the upper half is inserted into the end portion of each of the two supporters 70. The setscrew 72 is inserted into a side of the end portion to selectively engage the upper half of the shaft 71 to fix the shaft 71. The lower half of the shaft 71 is inserted into the pivot hole 346 and is locked with a nut 73, such that the end portion of each of the two supporters 70 is pivotably positioned in the respective recess 342 and is able to pivot on the shaft 71.

Figure 4:
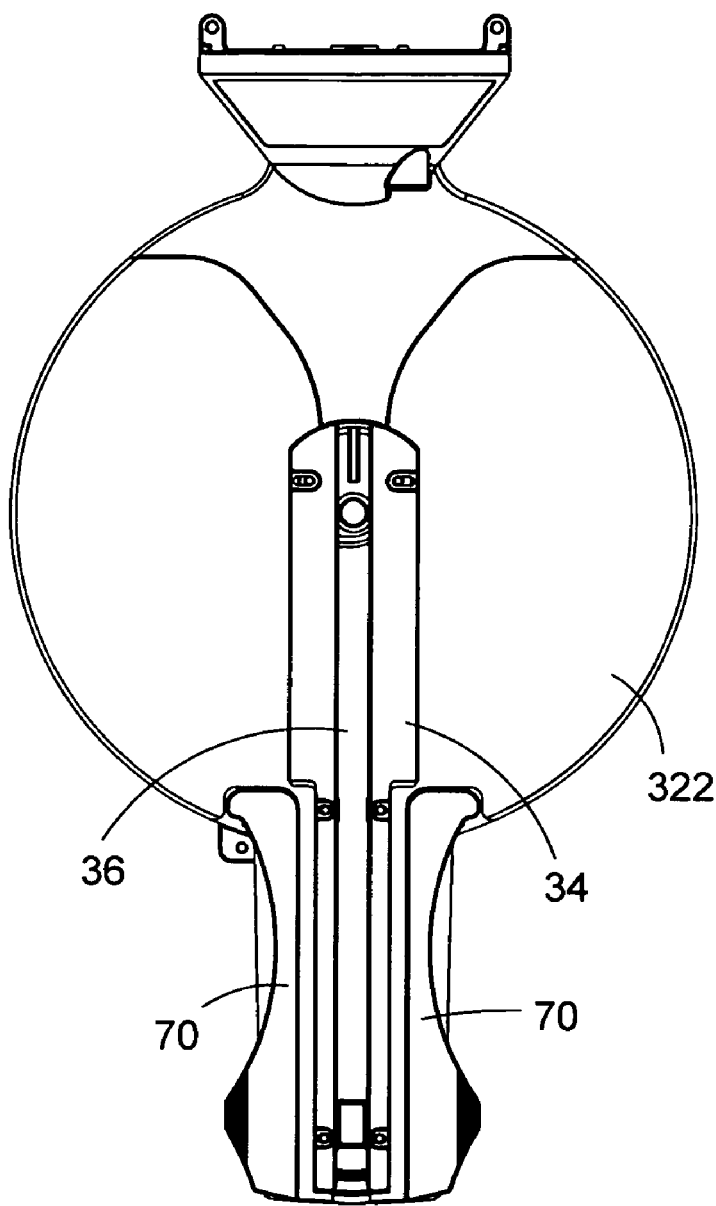
FIG. 4 is a top view of the rotatable table and the two supporters of the miter saw according to the exemplary embodiment.

Referring to FIGS. 3 and 4, the end portion of each of the two supporters 70 further includes a hole 74, a ball bearing 75, and a spring 76 installed in the hole 74. The two ends of the spring 76 respectively engage a bottom wall of the hole 74 and the ball bearing 75. The ball bearing 75 is selectively positioned in the set hole 344. A line formed between the set hole 344 and the pivot hole 346 is parallel to the extending direction of extended arm 34, thus when each of the two supporters 70 is rotated toward the extended arm 34 to make an inside wall of each of the two supporters 70 facing the extended arm 34 respectively mate with a side wall of the extended arm 34 facing each of the two supporters 70 and to make the ball bearing 75 roll into the set hole 344, each of the two supporters 70 is fixed temporarily and cannot be rotated freely. Furthermore, when each of the two supporters 70 is rotated outwards, the ball bearing 75 moves out of the set hole 344. Additionally, each of the two supporters 70 includes a pull portion 77 that is configured to be pulled outwards to a proper angle by the user.

According to the foregoing structure, when using the miter saw 10 provided by the exemplary embodiment to cut a broader workpiece 80, referring to FIG. 2, since the width of the workpiece 80 is larger than the width of the main body 32, a portion of workpiece 80 juts out over the main body 32 and extends along the extended arm 34, thus the user can pull the two supporters outward to a proper angle to assist in supporting the portion of workpiece 80 jutting out over the main body 32, such that the conventional drawback of instability caused by only using the extended arm 34 to support the portion of workpiece 80 jutting out over the main body 32 can be improved. Furthermore, when the workpiece 80 is in no need of auxiliary support, the two supporters 70 can be pivoted toward the extended arm 34 to respectively join the sides of the extended arm and to be in a storage status. Thus, when the supporters 70 are not needed, they do not extend out into the work area, and therefore safety is enhanced.

The foregoing discussion discloses and describes merely exemplary embodiments of the present disclosure for purposes of illustration only. One skilled in the art will readily recognize from such discussion, and from the accompanying drawings and claims, that various changes, modifications, and variations may be made therein without departing from the spirit and scope of the disclosure as defined in the following claims.

What is claimed is:

1. A miter saw having a saw blade carried by a saw arm, comprising:
    a base;
    a rotatable table having a support surface configured to support a workpiece, said table pivotally mounted to and rotatable relative to said base;
    said saw arm pivotally mounted to said rotatable table and rotatable downwards towards said support surface; and
    two supporters respectively pivotally mounted directly to said rotatable table so as to be pivotable relative to said rotatable table and rotatable along with said rotatable table;
    wherein the two supporters are pivotable between an unobtrusive stowed position when not in use and a supporting position when in use to support a workpiece thereon.

2. The miter saw according to claim 1, wherein said saw arm includes a support arm coupled to said rotatable table, a sliding arm slidably coupled to said support arm, and a pivot arm pivotally mounted to said sliding arm and coupled to said saw blade to allow said saw blade to slide relative to said support surface.

3. The miter saw according to claim 2, wherein said rotatable table includes a main body, an extended arm extending from said main body, and a slot, said two supporters are pivotably respectively located at two opposed outer sides of said extended arm, and said slot extends through said main body and through said extended arm and is configured to receive said saw blade therein, and a length of said slot corresponds to a sliding distance of said saw blade.

4. The miter saw according to claim 3, wherein said rotatable table further includes two recesses located on said main body and respectively at said two opposed outer sides of said extended arm, an end portion of each of said two supporters is set in a respective one of said two recesses.

5. The miter saw according to claim 3, wherein an inside wall of each of said two supporters facing said extended arm is capable of mating with a respective side wall of said extended arm facing each of said two supporters.

6. The miter saw according to claim 1, wherein each of said two supporters includes a receiving hole, a ball bearing, and a spring having first and second ends and positioned in said receiving hole, said rotatable table includes at least one set hole, the first end of said spring engaging a bottom wall of said receiving hole and the second end engaging said ball bearing, and said ball bearing configured to selectively engage said at least one set hole.

7. A miter saw having a saw blade carried by a saw arm, comprising:
    a base;
    a rotatable table having a main body and a top support surface configured to support a workpiece, said table pivotally mounted to and rotatable relative to said base;
    an extended arm extending from said main body, and a slot extending through said main body and through said extended arm;
    said saw arm having a support arm coupled to said rotatable table, a sliding arm slidably coupled to said support arm, and a pivot arm pivotally mounted to said sliding arm and rotatable downwards towards said top support surface;
    said saw blade mounted to said pivot arm and being selectively inserted into said slot and configured to slide relative to said top support surface, wherein a sliding distance of said saw blade corresponds to a length of said slot; and
    two supporters respectively pivotally mounted directly to two opposed outer sides of said extended arm so as to be pivotable relative to said rotatable table and rotatable along with said rotatable table;
    wherein the two supporters are pivotable between an unobtrusive stowed position when not in use and a supporting position when in use to support a workpiece thereon.

8. The miter saw according to claim 7, wherein an inside wall of each of said two supporters facing said extended arm is capable of mating with a respective side wall of said extended arm facing each of said two supporters.

9. The miter saw according to claim 8, wherein each of said two supporters includes a receiving hole, a ball bearing, and a spring having first and second ends and positioned in said receiving hole, said rotatable table includes at least one set hole, the first end of said spring engaging a bottom wall of said receiving hole and the second end engaging said ball bearing, and said ball bearing configured to selectively engage said at least one set hole.

10. The miter saw according to claim 9, wherein a line formed between a pivot point of each of said two supporters and said at least one set hole respectively located at the same side of said extended arm is parallel to an extending direction of said extended arm.

* * * * *